No. 621,651. Patented Mar. 21, 1899.
J. P. & P. VAN GELDER.
APPARATUS FOR SEPARATING SOLID IMPURITIES FROM AIR AND GASES AND SORTING SAME.
(Application filed Dec. 19, 1898.)
(No Model.) 4 Sheets—Sheet 4.

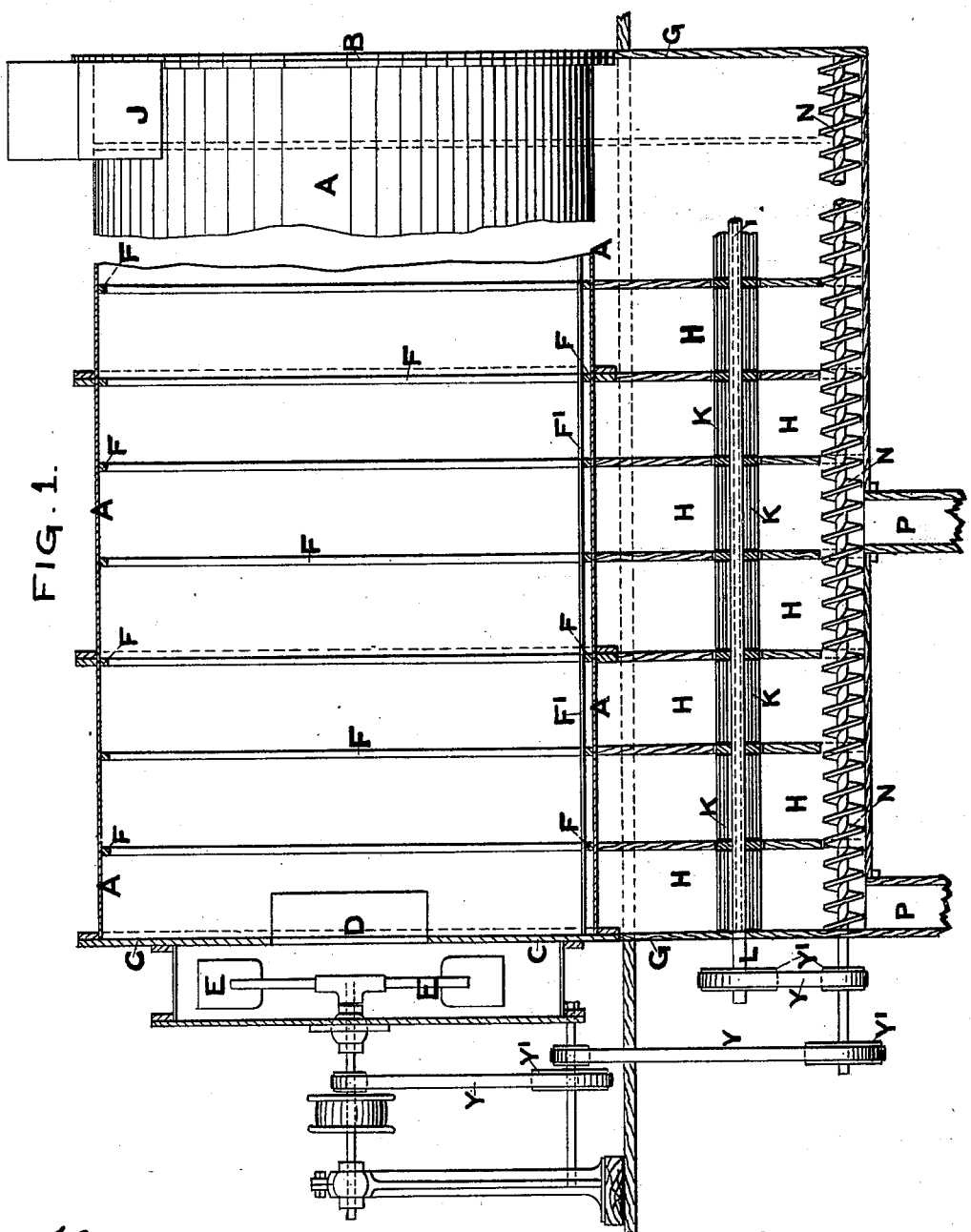

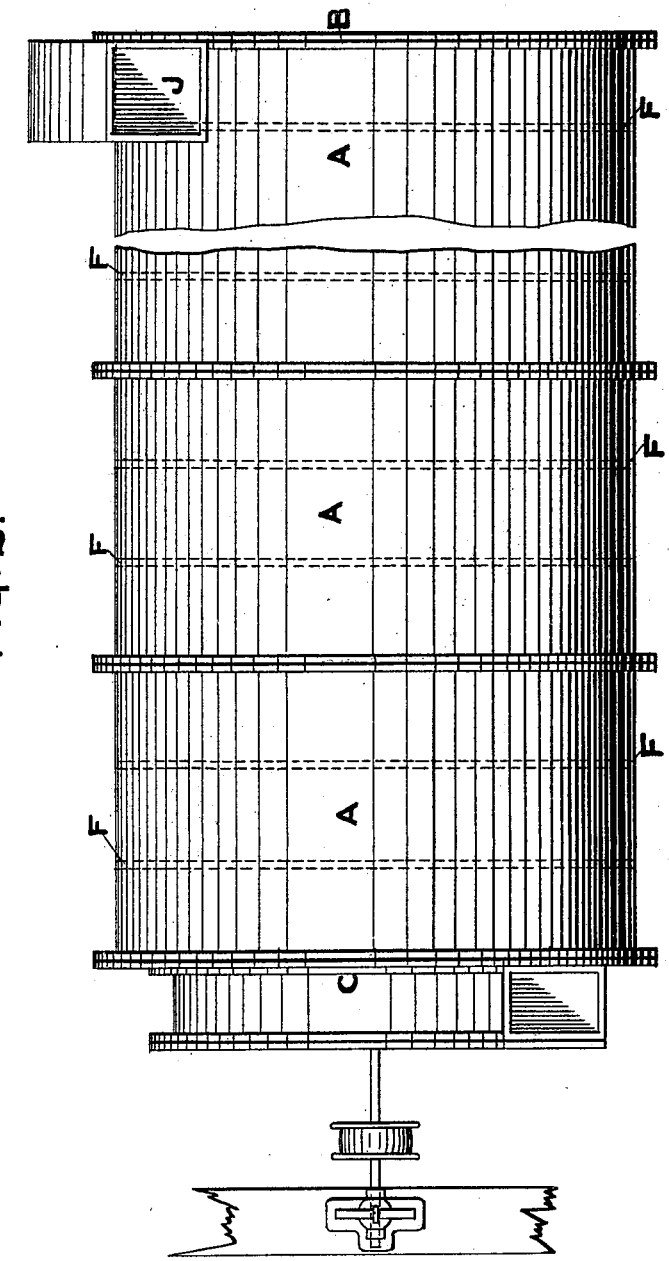

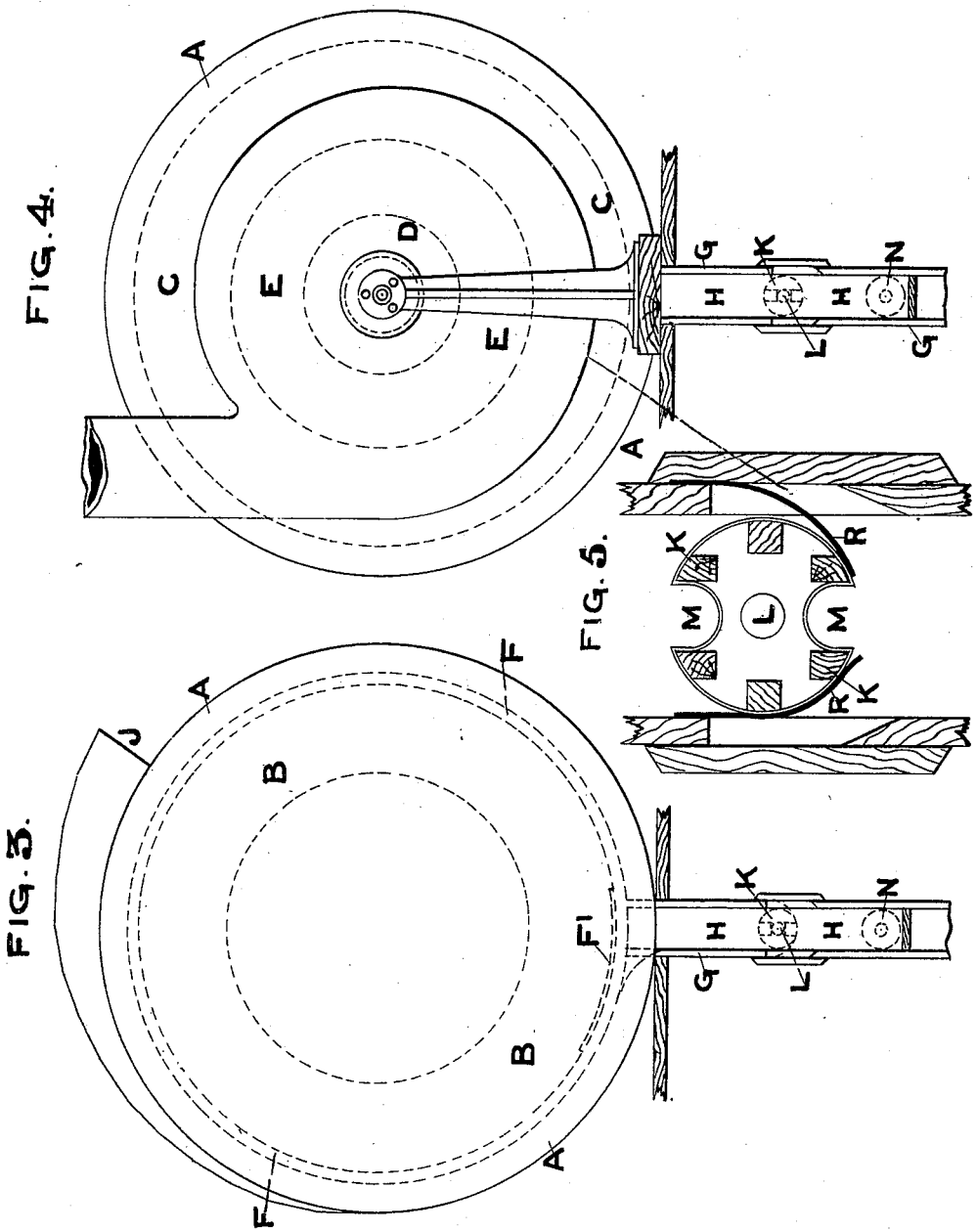

Witnesses
Inventors
Johannes Pieter van Gelder
Pieter van Gelder

UNITED STATES PATENT OFFICE.

JOHANNES PIETER VAN GELDER AND PIETER VAN GELDER, OF SOWERBY BRIDGE, ENGLAND.

APPARATUS FOR SEPARATING SOLID IMPURITIES FROM AIR AND GASES AND SORTING SAME.

SPECIFICATION forming part of Letters Patent No. 621,651, dated March 21, 1899.

Application filed December 19, 1898. Serial No. 699,664. (No model.)

*To all whom it may concern:*

Be it known that we, JOHANNES PIETER VAN GELDER and PIETER VAN GELDER, subjects of the Queen of Great Britain, residing at Sowerby Bridge, in the county of York, England, have invented certain new and useful Improvements in Apparatus for Separating Solid Impurities from Air and Gases and Sorting the Same, of which the following is a specification.

This invention has for its object an improvement in apparatus or machinery for collecting dust or other waste products of industrial establishments, known as "vortex machines," and in which the air passes tangentially into a chamber, causing the air to revolve rapidly therein and deposit the dust or waste in a quiet portion of the chamber.

The object of our invention is to construct and arrange a machine or apparatus which shall more perfectly collect the dust or waste products and at the same time sort or grade the same, so greatly increasing their commercial value.

Figure 6:
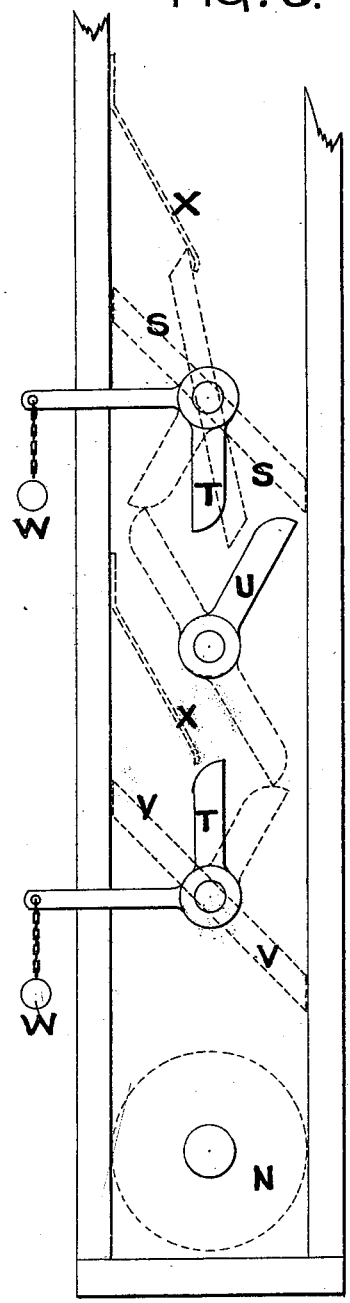
Figure 7:
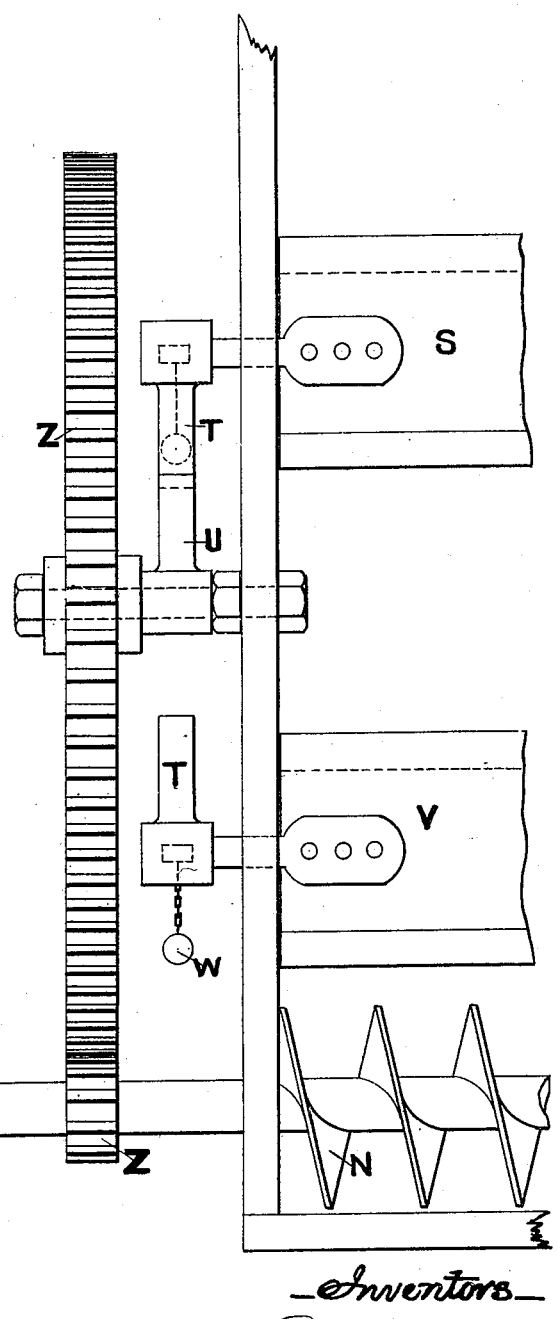

Figure 1 is a side elevation in section of our improved apparatus for separating solid impurities from air and gas and sorting or grading the same. Fig. 2 is a plan of our improved apparatus aforesaid. Figs. 3 and 4 are end views of Fig. 2. Fig. 5 is a sectional end view of valve for discharging the waste products after collection into suitable hoppers or upon a suitable conveyer for removal. Fig. 6 is an end elevation of a modification of Fig. 5. Fig. 7 is a side elevation of Fig. 6.

We preferably employ a cylinder A of a suitable length placed horizontally, one end B of which may be closed or, if desired, may have a small orifice in the center. The other end C of the cylinder is also closed, excepting for a larger orifice D, adjacent to which is fixed an exhaust-fan E. Inside the said cylinder A annular strips F are attached to the periphery at suitable distances or intervals apart, and underneath and communicating with the cylinder A there is placed a trough G, fitted with a series of divisions or receptacles H. These divisions or receptacles correspond with the number of strips F within the cylinder A.

The air or gases to be purified enters through the spiral or tangential inlet J near the closed end B of the cylinder A and causes the air to rotate spirally therein until it reaches the other end of the cylinder, whence it is drawn away in a purified state by the exhaust-fan E.

The dust or waste is deposited in the trough G by means of the rings or obstructions F, attached to the inside of the cylinder in such a manner that the heaviest products are discharged nearest to the closed end B and spiral or tangential inlet J of the cylinder and the finest or lighest products nearest to the exhaust-fan E at the opposite end of the cylinder.

To prevent the formation of air-currents in the trough or receptacles below the cylinder, we apply a thin metal segment F', so placed on the rings F as to sufficiently cover the trough or series of receptacles.

The entrance or exit of air up through the dust-receptacles is prevented by specially-designed valves consisting of a longitudinal cylinder K, mounted upon a shaft L. This cylinder is divided into sections corresponding with the number of segments in the cylinder A. Troughs M M, formed upon the outer surface of the cylinder K, receive and discharge the waste products at intervals onto an Archimedean conveyer N or into a series of hoppers for removal, or the conveyer N may collect the contents of several receptacles and discharge the same into one, two, or more hoppers P for removal. Flaps R, of leather or other suitable material, placed upon each side and in contact with the cylinder, prevent air from passing upward during such discharging.

The cylinder K is revolved by any approved mechanism. When the various grades of dust in the receptacles H are required to be kept separate, a separate hopper P for receiving the dust from each receptacle H must be provided; but when only two grades are required only two hoppers P need be provided, one at the middle and one at the rear end of the machine. A single conveyer N can be used no matter how many hoppers P are provided, or in place of the cylinder K we may construct the aforesaid valves or outlets one below the other, the upper valve S being opened at intervals by means of a weighted bell-crank lever T, operated by tappet, cam, or finger U. This finger U in revolving also after opening the top valve opens the bottom valve V, discharging the contents in a similar manner. These valves S and V are operated alternately in such a manner that when one is opened the other is closed, for the purposes before described.

Weights W, attached to the bell-crank levers, close the valves immediately they are released by the cam or finger U. A midfeather X of suitable metal, arranged within the series of receptacles, insures the perfect discharge of the dust or other waste products from one valve to the other.

The valves (see Figs. 1, 2, 3, 4, and 5) may be operated from the driving or fan shaft by straps Y and pulleys Y', so arranged as to operate the valve-spindle slowly, or, as shown at Figs. 6 and 7, the mechanism for operating the valves may be operated by gear-wheels Z from the conveyer-shaft with like result.

If desired, the cylinder may be placed at any angle to the horizon, but so far we have found the horizontal position to give the best results.

We are aware that this apparatus may or can be worked by pressure only or by blast and exhaust combined, but we prefer the exhaust only when the machine is to be used to separate fine dust.

What we claim is—

1. In a dust-collector, the combination, with a cylindrical chamber having a series of annular obstructing-strips F, and a series of receptacles H at its lower side corresponding with the spaces between the said strips; of means for drawing a current of impure air through the said chamber, a plate F' resting on the tops of the strips F over the receptacles, and discharge-valves in the receptacles H, substantially as set forth.

2. In a dust-collector, the combination, with a cylindrical chamber having a series of annular obstructing-strips F, and a series of receptacles H at its lower side corresponding with the spaces between the said strips; of means for drawing a current of impure air through the said chamber, a plate F' resting on the tops of the strips F over the receptacles, a valve-cylinder K extending through all the said receptacles and provided with pockets M, flaps R of flexible material for keeping the valve-cylinder substantially airtight, a single screw conveyer common to all the said receptacles, hoppers P below the screw conveyer, and driving mechanism for revolving the said valve-cylinder and screw conveyer, substantially as set forth.

In testimony whereof we affix our signatures in the presence of two witnesses.

JOHANNES PIETER VAN GELDER.
PIETER VAN GELDER.

Witnesses:
WM. MACFARLANE,
D. W. JUANER.